(12) United States Patent
Farnsworth et al.

(10) Patent No.: US 11,450,871 B2
(45) Date of Patent: Sep. 20, 2022

(54) AIR SUPPLY CONTROL METHOD TO FUEL CELL SYSTEM

(71) Applicants: Toyota Motor Engineering & Manufacturing North America, Inc., Plano, TX (US); Toyota Jidosha Kabushiki Kaisha, Toyota (JP)

(72) Inventors: Jared M. Farnsworth, San Francisco, CA (US); Daniel C. Folick, Long Beach, CA (US); Shigeki Hasegawa, Toyota (JP); Naoki Tomi, Toyota (JP)

(73) Assignees: TOYOTA JIDOSHA KABUSHIKI KAISHA, Toyota (JP); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 54 days.

(21) Appl. No.: 17/181,984

(22) Filed: Feb. 22, 2021

(65) Prior Publication Data
US 2022/0271310 A1 Aug. 25, 2022

(51) Int. Cl.
*H01M 8/04746* (2016.01)
*H01M 8/0438* (2016.01)
*H01M 8/04089* (2016.01)

(52) U.S. Cl.
CPC ..... *H01M 8/04753* (2013.01); *H01M 8/0438* (2013.01); *H01M 8/04089* (2013.01); *H01M 2250/20* (2013.01)

(58) Field of Classification Search
CPC ........ H01M 8/04753; H01M 8/04089; H01M 8/0438; H01M 2250/20
See application file for complete search history.

(56) References Cited

U.S. PATENT DOCUMENTS

| | | | | |
|---|---|---|---|---|
| 2016/0141684 | A1* | 5/2016 | Yamanaka | H01M 8/04753 429/444 |
| 2016/0308228 | A1* | 10/2016 | Takahashi | H01M 8/04395 |
| 2019/0036140 | A1* | 1/2019 | Okuyoshi | H01M 8/04097 |
| 2019/0181464 | A1* | 6/2019 | Farnsworth | H01M 8/04089 |

* cited by examiner

*Primary Examiner* — Stewart A Fraser
(74) *Attorney, Agent, or Firm* — Snell & Wilmer LLP (57) ABSTRACT

A system for controlling gas flow in a fuel cell circuit includes a fuel cell stack and a valve designed to adjust gas flow through the circuit. The system further includes an ECU that is designed to determine a target flow rate of the gas through the valve. The ECU is further designed to determine a flow compensation value corresponding to an amount of compensation of the target flow rate of the gas through the valve that compensates for fluid accumulation or decumulation in the fuel cell circuit. The ECU is further designed to determine a compensated target flow rate of the gas through the valve based on the target flow rate and the flow compensation value. The ECU is further designed to determine a desired valve position of the valve based on the compensated target flow rate and to control the valve to have the desired valve position.

20 Claims, 6 Drawing Sheets

AIR SUPPLY CONTROL METHOD TO FUEL CELL SYSTEM

BACKGROUND

1. Field

The present disclosure relates to systems and methods for controlling gas flow through a fuel cell stack of a fuel cell circuit based on a real-time model of the circuit and, more particularly, to systems and methods for determining compensated flow targets for valves of the fuel cell circuit based on fluid accumulation or decumulation throughout the circuit.

2. Description of the Related Art

As the push for conservation of natural resources and reduced pollution advances, various concepts have been discovered to achieve such goals. These concepts range from harvesting wind and sun-based energy to various improvements in vehicle design. The vehicle improvements include new engines designed to improve fuel economy, hybrid vehicles that operate using a combination of an engine and a motor-generator to further improve fuel economy, fully electric vehicles that operate based on power stored in a battery, and fuel cell vehicles that generate electricity by facilitating a chemical reaction.

Many fuel cell vehicles include a fuel cell stack that includes multiple fuel cells. The fuel cells may receive fuel, which typically includes hydrogen, along with oxygen (via air) or another oxidizing agent. The fuel cell stack may facilitate a chemical reaction between the hydrogen and oxygen. This chemical reaction generates electricity and water as a byproduct. The electricity generated by the fuel cell stack may be stored in a battery or directly provided to a motor-generator to generate mechanical power to propel the vehicle. While fuel cell vehicles are an exciting advancement in the automobile industry, the technology is relatively new, providing space for improvements to the technology.

Electrical output of the fuel cell stack varies based on a pressure and flow of the gases (e.g., hydrogen and air) received by the stack. The pressure and flow of the gases may be adjusted by changing the states of various actuators that control gas flow in the fuel cell circuit. The actuators may include, for example, a compressor, a valve, or the like. Additional elements may exist in the circuit, and pipes may connect the elements together. The compressor may operate in a surge condition if the ratio of gas flow to pressure ratio of the compressor is not properly controlled, meaning that fluid instability exists within the compressor while operating in the surge condition. It is therefore desirable to avoid operation of the compressor in the surge condition.

During operation of a fluid dynamics circuit, it may be computationally expensive to model all aspects of the circuit. For example, the model may require or utilize a relatively large quantity of computations to account for fluid accumulation or decumulation in the circuit during state changes of actuators in the circuit. Therefore, many models ignore the fluid accumulation or decumulation aspect. However, this may cause improper control of the actuators, which may result in the compressor operating in a surge condition.

Thus, there is a need in the art for systems and methods for accurately controlling actuators in a fuel cell circuit.

SUMMARY

Described herein is a system for controlling gas flow in a fuel cell circuit of a vehicle. The system includes a fuel cell stack having a plurality of fuel cells and designed to receive a gas. The system further includes a valve having a valve position and designed to adjust a flow of the gas through at least a portion of the fuel cell circuit. The system further includes an electronic control unit (ECU) coupled to the sensor and the valve. The ECU is designed to determine a target flow rate of the gas through the valve. The ECU is further designed to determine a flow compensation value corresponding to an amount of compensation of the target flow rate of the gas through the valve that compensates for fluid accumulation or decumulation in the fuel cell circuit. The ECU is further designed to determine a compensated target flow rate of the gas through the valve based on the target flow rate and the flow compensation value. The ECU is further designed to determine a desired valve position of the valve based on the compensated target flow rate. The ECU is further designed to control the valve to have the desired valve position.

Also described is a system for controlling gas flow in a fuel cell circuit of a vehicle. The system includes a fuel cell stack having a plurality of fuel cells and designed to receive a gas. The system further includes a valve having an inlet, an outlet, and a valve position and designed to adjust a flow of the gas through at least a portion of the fuel cell circuit. The system further includes an electronic control unit (ECU) coupled to the sensor and the valve. The ECU is designed to determine a target flow rate of the gas through the valve. The ECU is further designed to determine a flow compensation value corresponding to an amount of compensation of the target flow rate of the gas through the valve that compensates for fluid accumulation or decumulation in the fuel cell circuit. The ECU is further designed to determine a compensated target flow rate of the gas through the valve based on the target flow rate and the flow compensation value. The ECU is further designed to calculate a target valve pressure of the gas at least one of at the inlet of the valve or at the outlet of the valve. The ECU is further designed to determine a desired valve position of the valve based on the compensated target flow rate and the target valve pressure. The ECU is further designed to control the valve to have the desired valve position.

Also described is a method for controlling gas flow in a fuel cell circuit of a vehicle. The method includes determining, by an electronic control unit (ECU), a target flow rate of a gas through a valve of the fuel cell circuit. The method further includes determining, by the ECU, a flow compensation value corresponding to an amount of compensation of the target flow rate of the gas through the valve that compensates for fluid accumulation or decumulation in the fuel cell circuit. The method further includes determining, by the ECU, a compensated target flow rate of the gas through the valve based on the target flow rate and the flow compensation value. The method further includes determining, by the ECU, a desired valve position of the valve based on the compensated target flow rate. The method further includes controlling, by the ECU, the valve to have the desired valve position.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling gas flow in a fuel cell circuit. The systems provide various benefits and advantages such as compensating for dynamic properties of the gas during control of the circuit. This advantageously allows for more precise control of the fuel cell circuit, which also beneficially reduces the likelihood of a compressor of the circuit operating in a surge condition. This increased precision of control also advantageously causes a fuel cell stack to generate power that is closer to a target power request of the stack. The system advantageously implements the compensation using an algorithm or a model that is relatively computationally inexpensive, reducing computational power requirements of the system. The system is beneficially capable of accurate determination of states of the fuel cell circuit using as few as two sensors, thus reducing the hardware complexity and cost of the system.

An exemplary system includes a fuel cell circuit having a fuel cell stack and a valve. The valve has a valve position that can be adjusted based on desired pressures and flow rates of a gas through various components of the circuit (e.g., at the fuel cell stack). The system further includes an electronic control unit (ECU). The ECU is designed to determine a target flow rate of the gas through the valve (either via a received request or by calculating the target flow rate based on another request, such as a requested amount of power from a motor-generator). The ECU is further designed to compensate the target flow rate to account for dynamics of the gas (e.g., fluid accumulation or decumulation in pipes of the circuit) during changing states of the circuit. The ECU is further designed to determine a target valve position of the valve that will achieve the target flow rate, and to control the valve to have the target valve position.

Figure 1:
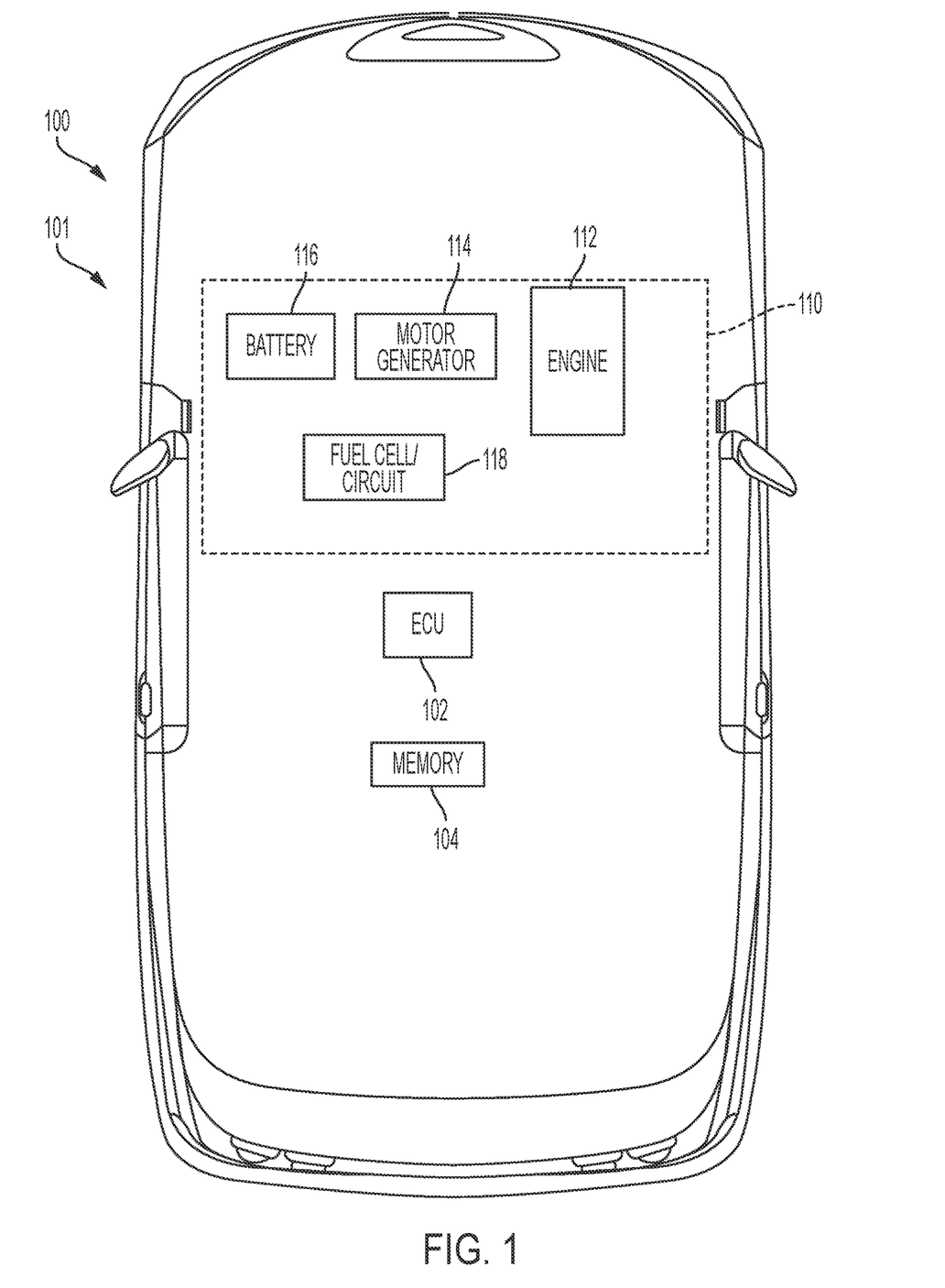
FIG. 1 is a block diagram illustrating various components of a vehicle having a fuel cell circuit capable of generating electricity based on a chemical reaction according to an embodiment of the present invention.

Turning to FIG. 1, a vehicle 100 includes components of a system 101 for providing gas, such as air, to fuel cells. In particular, the vehicle 100 and system 101 include an ECU 102 and a memory 104. The vehicle 100 further includes a power source 110 which may include at least one of an engine 112, a motor-generator 114, a battery 116, and/or a fuel cell circuit 118. The fuel cell circuit 118 may be a part of the system 101.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination location.

The memory 104 may include any non-transitory memory known in the art. In that regard, the memory 104 may store machine-readable instructions usable by the ECU 102 and may store other data as requested by the ECU 102 or programmed by a vehicle manufacturer or operator. The memory 104 may store one or more models of the fuel cell circuit 118. The model(s) may include equations, tables, or other information usable to estimate various parameters of the fuel cell circuit 118. That is, the model(s) of the fuel cell circuit may determine a current or present state of each component (e.g., actuators, pipes, or the like) of the fuel cell circuit 118. The state of each component may include a pressure value (e.g., both at an inlet and at an outlet of the component) and a flow value through the component. The model(s) may be a real-time model or a near-real-time model which continuously or periodically (e.g., at least every second, at least every half second, at least every tenth of a second, or the like) determines new states for each component.

The engine 112 may convert a fuel into mechanical power. In that regard, the engine 112 may be a gasoline engine, a diesel engine, or the like.

The battery 116 may store electrical energy. In some embodiments, the battery 116 may include any one or more energy storage device including a battery, a fly-wheel, a super-capacitor, a thermal storage device, or the like.

The fuel cell circuit 118 may include a plurality of fuel cells that facilitate a chemical reaction to generate electrical energy. For example, the fuel cells may receive hydrogen and oxygen, may facilitate a reaction between the hydrogen and oxygen, and may output electricity in response to the reaction. In that regard, the electrical energy generated by the fuel cell circuit 118 may be stored in the battery 116 or directly utilized by the motor-generator 114 or another component of the vehicle 100 (e.g., a heating-ventilation-air conditioning (HVAC) unit). In some embodiments, the vehicle 100 may include multiple fuel cell circuits including the fuel cell circuit 118.

The motor-generator 114 may convert the electrical energy stored in the battery (or electrical energy received directly from the fuel cell circuit 118) into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100 (e.g., an HVAC system). In some embodiments, the motor-generator 114 may also or instead include a turbine or other device capable of generating thrust.

Figure 2:
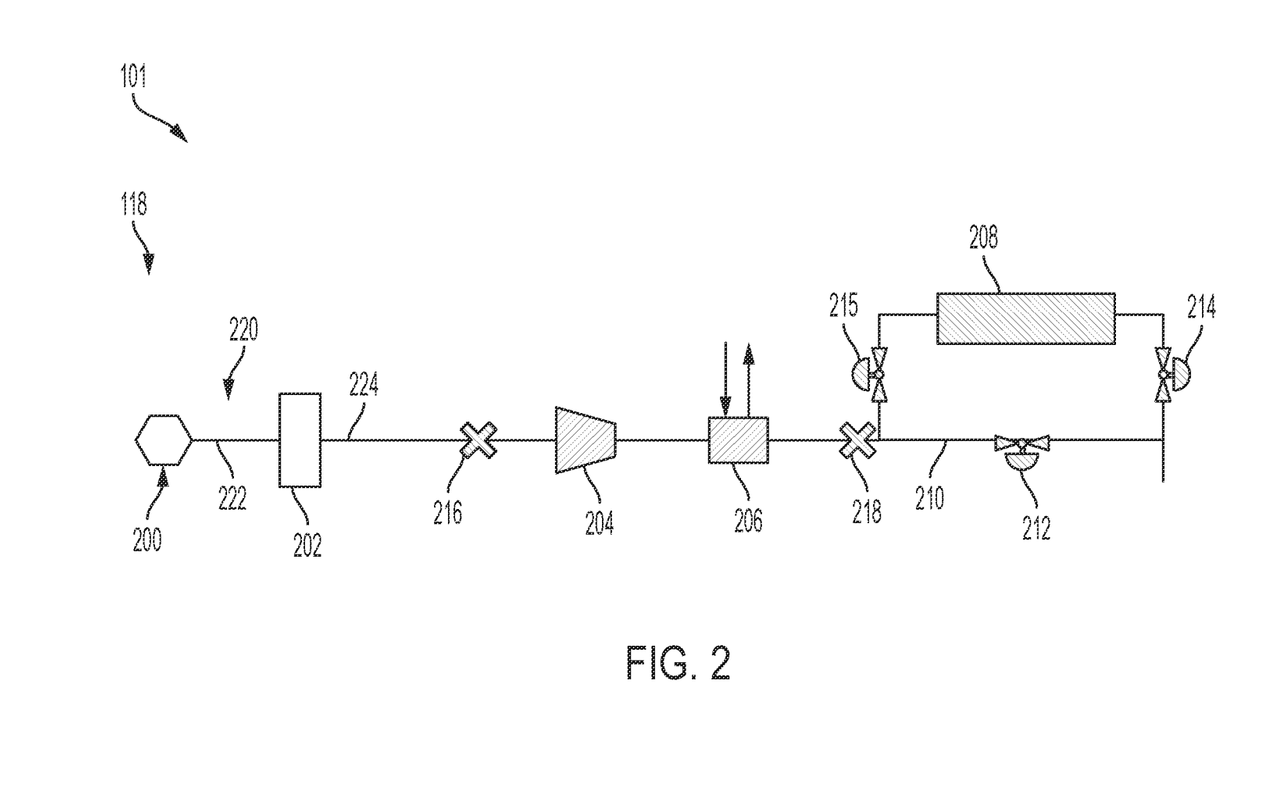
FIG. 2 is a block diagram illustrating various features of the fuel cell circuit of FIG. 1 according to an embodiment of the present invention.

Turning now to FIG. 2, additional details of the fuel cell circuit 118 are illustrated. In particular, the fuel cell circuit 118 includes an air intake 200, an air cleaner 202, a compressor 204, an intercooler 206, a fuel cell stack 208, a bypass branch 210, a bypass valve 212 positioned along the bypass branch 210, a restriction valve 214, and an inlet valve 215.

The air intake 200 may receive air from an ambient environment, such as outside of the vehicle 100 of FIG. 1. In some embodiments, the air intake 200 may include a filter for filtering debris from the received air. The air cleaner 202 may include a filter or other device capable of removing debris and other impurities from the air received from the air intake 200.

The compressor 204 may be a turbo compressor or other compressor capable of pressurizing air. In that regard, the compressor 204 may draw air from the cleaner 202 and may output pressurized air.

Figure 3:
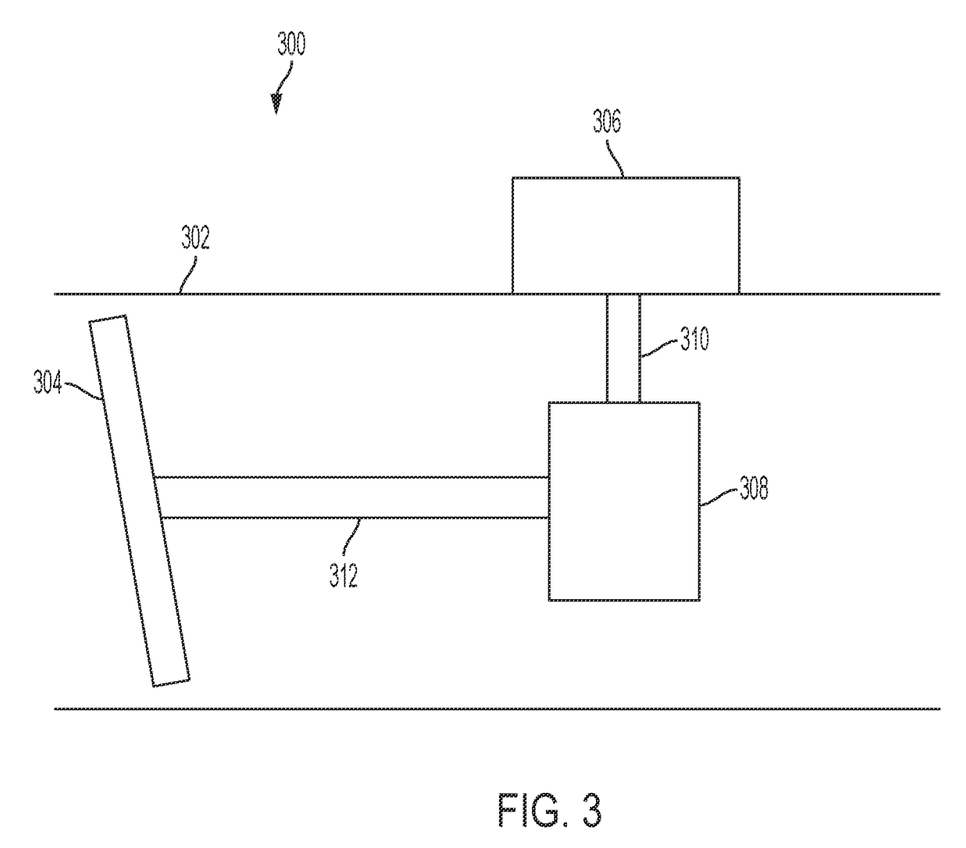
FIG. 3 is cross-sectional view of an exemplary valve for use in a fuel cell circuit according to an embodiment of the present invention.

With brief reference to FIG. 3, an exemplary valve 300 may be used as any of the valves of FIG. 2. In particular, the valve 300 includes a body 302 through which air may be drawn. A plug 304, which may include any shape, may be located inside of the body 302. A motor 306 (or other power source such as an electric actuator) may generate mechanical power which may be received by a gearbox 308 via a shaft 310. The gearbox 308 may transfer the power received from the motor 306 to a shaft 312 connected to the plug 304. The mechanical power from the gearbox 308 may be applied to the plug 304 via the shaft 312 to change position of the plug 304 relative to the body 302 in order to adjust a valve position of the valve 300 (e.g., to increase or decrease flow of the fluid through the valve 300). One skilled in the art will realize that a valve as used herein may have similar features as the valve 300 or different features without departing from the scope of the present disclosure.

Returning reference to FIG. 2, the fuel cell circuit 118 may further include an intercooler 206. The intercooler 206 may receive the air from the compressor 204 and may also receive a fluid, such as a coolant. The intercooler 206 may at least one of transfer thermal energy (i.e., heat) from the air to the coolant or transfer heat from the coolant to the air. In that regard, the intercooler 206 may adjust a temperature of the air flowing through the fuel cell circuit 118.

The fuel cell stack 208 may include a plurality of fuel cells. The fuel cells may receive hydrogen along with the air from the intercooler 206. The fuel cells may facilitate a chemical reaction between the oxygen in the air and the hydrogen, which may generate electricity.

The air from the intercooler 206 may be split such that some of the air flows through the fuel cell stack 208 and some of the air flows through the bypass branch 210. In that regard, the air flowing through the bypass branch 210 fails to flow through the fuel cell stack 208. The bypass valve 212 may have an adjustable valve position. The adjustable valve position of the bypass valve 212 may be controlled to adjust an amount of airflow through the bypass branch 210 and, likewise, to adjust an amount of airflow through the fuel cell stack 208. For example, when the bypass valve 212 is 100 percent (100%) closed then all the airflow through the fuel cell circuit 118 flows through the fuel cell stack 208.

Although discussion may reference airflow through the fuel cell circuit 118, one skilled in the art will realize that any other gas flow may be substituted for the airflow without departing from the scope of the present disclosure. For example, a similar circuit may be utilized to provide hydrogen or another gas to the fuel cell stack 208.

The restriction valve 214 may likewise have an adjustable valve position. The adjustable valve position of the restriction valve 214 may be controlled to adjust a pressure of the air within the fuel cell stack 208. For example, the pressure within the fuel cell stack 208 may be increased by closing the restriction valve 214 and the pressure may be decreased by opening the restriction valve 214.

The inlet valve 215 may also have an adjustable valve position. The adjustable valve position of the inlet valve 215 may be controlled to adjust a pressure of the air received by the fuel cell stack 208. For example, the pressure of the air provided to the fuel cell stack 208 may be reduced by closing the inlet valve 215 and the pressure may be increased by opening the inlet valve 215.

Referring to FIGS. 1 and 2, each of the compressor 204, the bypass valve 212, the restriction valve 214, and the inlet valve 215 may be considered actuators and may be controlled by the ECU 102. For example, the ECU 102 may receive a power request from a driver of the vehicle (or may generate a power request in an autonomous or semi-autonomous vehicle). The power request may indicate an amount of power requested of the fuel cell circuit 118 and may be generated as a result of a request to accelerate or decelerate the vehicle 100. The ECU 102 may convert the power request into at least one of a desirable pressure value or a desirable flow value corresponding to a desirable pressure or a desirable airflow at specific locations within the fuel cell circuit 118. The ECU 102 may then control each of the compressor 204, the bypass valve 212, the restriction valve 214, and the inlet valve 215 in order to achieve the desirable pressure or flow values.

The fuel cell circuit 118 may further include a flow sensor 216 and a pressure sensor 218. The flow sensor 216 may detect a flow of the gas (such as a mass flow) through the compressor 204. The pressure sensor 218 may detect a pressure of the gas at an outlet of the intercooler 206. In some embodiments, the flow sensor 216 and the pressure sensor 218 may be positioned at different locations within the fuel cell circuit 118 without departing from the scope of the present disclosure.

The fuel cell circuit 118 may further include a plurality of pipes 220. For example, the plurality of pipes 220 may include a first pipe 222 that transfers the gas from the intake 200 to the air cleaner 202 and a second pipe 224 that transfers the gas from the air cleaner 202 to the flow sensor 216. In some embodiments, two or more components (e.g., the intake 200, the air cleaner 202, and the flow sensor 216) may be directly connected without any pipes.

Figure 4:
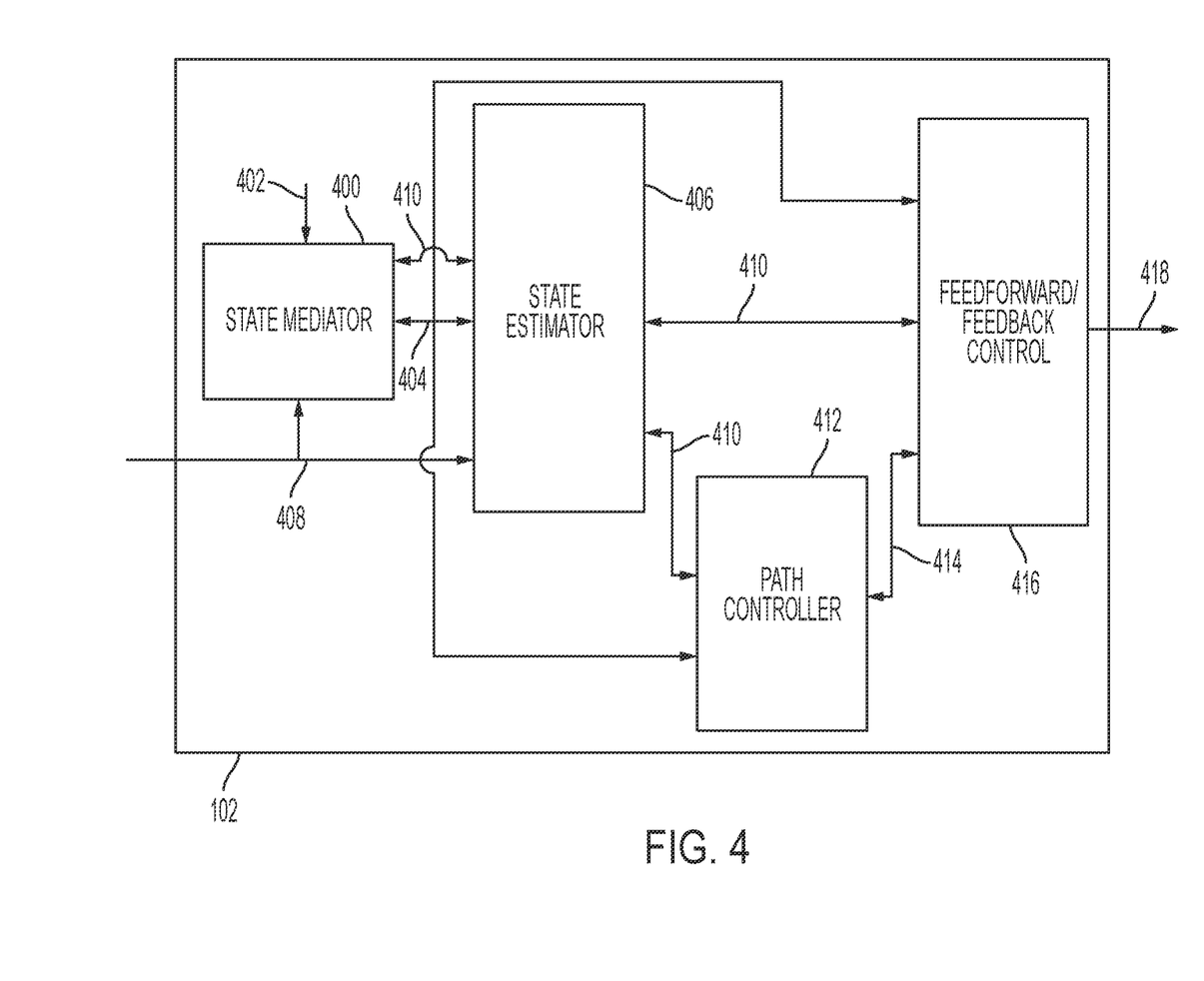
FIG. 4 is a block diagram illustrating various logic components of an electronic control unit (ECU) of the vehicle of FIG. 1 for providing a gas to the fuel cell circuit at a desirable flow rate and pressure according to an embodiment of the present invention.

Referring now to FIGS. 2 and 4, the ECU 102 may include various processes or functions for controlling the fuel cell circuit 118. The processes or functions within the ECU 102 may each be implemented in hardware (i.e., performed by a dedicated hardware), may be implemented in software (i.e., a computer, processor or ECU running software stored in a non-transitory memory), or may be implemented via a combination of hardware and software. The functions described with reference to FIG. 4 may be used to create a real-time or near-real-time model of the fuel cell circuit 118 and to control the various actuators of the fuel cell circuit 118 based on the model. A near-real-time model refers to the fact that the ECU 102 may determine states of the components of the fuel cell circuit 118 within 0.01 seconds, within 0.1 seconds, within 0.5 seconds, within 1 second, within 2 seconds, within 5 seconds, or the like of any given point in time.

In particular, the ECU 102 may include a state mediator 400. The state mediator 400 may receive a control signal 402 corresponding to desirable pressure and/or flow values (i.e., at least one target pressure value or at least one target flow value). The control signal 402 may also or instead correspond to a power request. In some embodiments, the state mediator 400 may further receive sensor data 408 detected by the flow sensor 216 and the pressure sensor 218. The state mediator 400 may analyze the target pressure and flow values and determine whether the target values are feasible based on the mechanics of the fuel cell circuit 118 and whether one or more component of the fuel cell circuit 118 is likely to become damaged in an attempt to meet a target value. In some embodiments, the state mediator 400 may determine whether the target values are feasible based on the sensor data 408. The state mediator 400 may then output mediated target values 404 that are feasible by the fuel cell circuit 118 and that are unlikely to damage a component of the fuel cell circuit 118.

The ECU 102 may further include a state estimator 406. The state estimator 406 may receive the mediated target values 404 along with sensor data 408 detected by the flow sensor 216 and the pressure sensor 218. The state estimator 406 may calculate or estimate current pressure values and flow values corresponding to each component of the fuel cell circuit 118 (including the plurality of pipes 220). That is, the state estimator 406 may calculate or estimate a current state of each component of the fuel cell circuit 118 based on the detected data from the flow sensor 216 and from the pressure sensor 218. The state estimator 406 may output the current estimated values 410. In some embodiments, the state mediator 400 may receive the current estimated values 410 and determine the mediated target values 404 further based on the current estimated values 410. In some embodiments, the state estimator 406 may also determine or adjust the mediated target values 404. The state estimator 406 is advantageous as it can accurately determine or estimate pressure and flow values for each component of the fuel cell circuit based on data from only the two sensors. However, one skilled in the art will realize that the present disclosure applies equally a system having a different configuration of sensors (e.g., greater or fewer sensors, only pressure sensors, only flow sensors, or the like).

The ECU 102 may also include a path controller 412. The path controller 412 may receive the current estimated values 410 along with the mediated target values 404. The path controller 412 may identify a desirable path of control of the compressor 204 from the current estimated values 410 to the mediated target values 404. The path controller 412 may determine and output desirable intermediate targets 414 that lay along the desirable path from the current estimated values 410 to the mediated target values 404. In various embodiments, the ECU may lack the path controller 412 without departing from the scope of the present disclosure.

The ECU 102 may also include a feedforward and feedback control 416. The feedforward and feedback control 416 may receive the desirable intermediate targets 414 along with the current estimated values 410 and the mediated target values 404. The feedforward and feedback control 416 may determine and output control signals 418 that may control operation of the actuators of the fuel cell circuit 118.

For example, the feedforward and feedback control 416 may determine target valve positions of the valves 212, 214, 215 based on the current estimated values 410, the mediated target values 404, and the desirable intermediate targets 414.

Occasionally (e.g., during pressure transients), fluid (i.e., gas particles) may accumulate or decumulate as pressure changes to the final steady state pressure in pipes and components of the fuel cell circuit 118. The feedforward and feedback control 416 may fail to compensate for such fluid accumulation or decumulation. In that regard, target flow values for the valves 212, 214, 215 during control of the valves 212, 214, 215 between two or more desirable intermediate targets 414 of the compressor 204 may be inaccurate. In that regard, the feedforward and feedback control 416 may be designed to compensate for such fluid accumulation or decumulation during dynamic control of the compressor 204.

Figure 5:
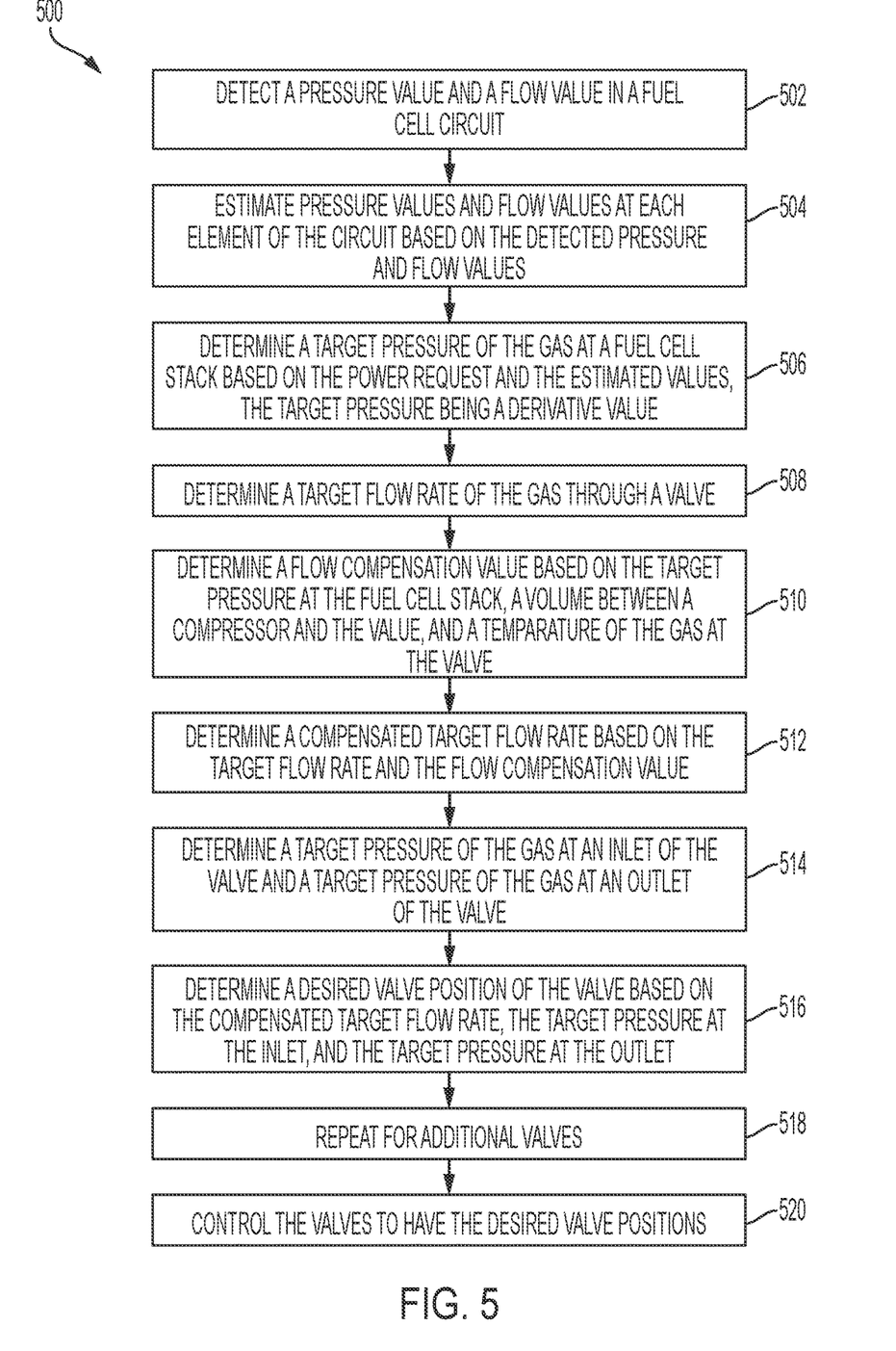
FIG. 5 is a flowchart illustrating a method for estimating pressure and flow values for multiple components of a fuel cell circuit while compensating for fluid accumulation or decumulation in the circuit and for controlling actuators of the circuit based on the estimated values according to an embodiment of the present invention.

Turning now to FIG. 5, a method 500 for controlling gas flow in a fuel cell circuit, such as the fuel cell circuit 118 of FIG. 2, is shown. The method 500 may compensate for fluid accumulation or decumulation in the pipes of the fuel cell circuit. In particular, the method 500 may begin in block 502 in which a pressure sensor may detect a pressure value in the fuel cell circuit, and a flow sensor may detect a flow value in the fuel cell circuit. The fuel cell circuit may include a single pressure sensor and a single flow sensor or may include any additional or alternative sensors.

In block 504, an ECU may estimate pressure values and flow values at each element of the fuel cell circuit based on the detected pressure values and the detected flow values. In some embodiments, the ECU may estimate additional values of the elements such as flow resistance, a temperature of the gas, or the like. For example, a state estimator of the ECU may estimate these states of each component of the fuel cell circuit.

In block 506, the ECU may determine or receive a target pressure of the gas at a fuel cell stack of the fuel cell circuit. The target pressure may be determined based on a power request and the determined states of the elements. The target pressure may change over time, either continuously or periodically (e.g., every tenth of a second, every half of a second, every second, or the like). In some embodiments, the target pressure may be calculated or determined using a derivative calculation on one or more variables such that the target pressure continuously or periodically changes over time. In some embodiments, the ECU may determine additional information in block 506 such as a target pressure at additional or alternative locations in the fuel cell circuit, target flow values at one or more location in the fuel cell circuit (e.g., at the fuel cell stack), or the like.

In block 508, the ECU may determine a target flow rate of the gas through one or more valves of the fuel cell circuit. The ECU may determine the target flow rate based on information such as the target pressure at the fuel cell stack, the target pressure at the compressor, the target flow rates through the fuel cell stack, the target flow rate through the compressor, the current states of the elements, or the like. The ECU may determine a target flow rate through any one or more of a bypass valve, a restriction valve, or an inlet valve. For example, the ECU may use an equation similar to Equation 1 below to calculate a target flow rate through a restriction valve:

$$Q_{ARV\_ref} = Q_{fc\_ref} \qquad \text{Equation 1:}$$

In Equation 1, $Q_{ARV\_ref}$ is the target flow rate through the restriction valve and $Q_{fc\_ref}$ is the target flow rate through the fuel cell stack. The target flow rates through the restriction valve and the fuel cell stack can be assumed to be equal because the restriction valve and the fuel cell stack are located in series with each other.

The ECU may use an equation similar to Equation 2 below to calculate a target flow rate through a bypass valve:

$$Q_{ABV\_ref} = Q_{ACP\_ref} - Q_{fc\_ref} \qquad \text{Equation 2:}$$

In Equation 2, $Q_{ABV\_ref}$ is the target flow rate through the bypass valve and $Q_{ACP\_ref}$ is the target flow rate through the compressor.

Although equations are not provided for the inlet valve, one skilled in the art will realize that similar equations may be utilized to determine the various target values of the inlet valve without departing from the scope of the present disclosure.

In block 510, the ECU may determine a compensation value of a valve based on the target pressure at the fuel cell stack (which is a time-changing derivative value, as discussed above), based on a volume of the fuel cell circuit between the compressor and the respective valve, and based on a temperature of the gas at the valve (potentially also with additional variables as described below). The compensation value refers to a flow value that can be added to the target flow rates discussed above to compensate for fluid accumulation or decumulation between the compressor and the respective valve. For example and with brief reference to FIG. 2, the ECU may determine the compensation value of the bypass valve 212 using the volume of all pipes (and potentially other elements such as the intercooler 206) that are located between an outlet of the compressor 204 and an inlet of the bypass valve 212. Returning reference to FIG. 5, the ECU may determine the compensation value of the restriction valve using an equation similar to Equation 3 below:

$$\Delta Q_{ARV\_ref} = -k_{ARV} \frac{V}{R_{gas} T_{ARV}} \dot{P}_{fc\_ref} \qquad \text{Equation 3}$$

In Equation 3, $\Delta Q_{ARV\_ref}$ refers to the compensation value of the restriction valve. $k_{ARV}$ refers to a correction coefficient of the restriction valve target flow rate and is set to between 0 and 1. V refers to the volume of the fuel cell circuit between an outlet of the compressor and an inlet of the restriction valve (e.g., a total volume of all pipes, and potentially other elements, between the compressor outlet and the restriction valve inlet). $R_{gas}$ refers to the universal gas constant and has a value of 8.3145 Joules*mol$^{-1}$*Kelvin$^{-1}$. $T_{ARV}$ refers to a temperature of the gas at the inlet of the restriction valve. $\dot{P}_{fc\_ref}$ refers to the target pressure at the fuel cell stack.

Similarly, the ECU may determine the compensation value of the bypass valve using an equation similar to Equation 4 below:

$$\Delta Q_{ABV\_ref} = -k_{ABV} \frac{V}{R_{gas} T_{ABV}} \dot{P}_{fc\_ref} \qquad \text{Equation 4}$$

In Equation 4, $\Delta Q_{ABV\_ref}$ refers to the compensation value of the bypass valve. $k_{ABV}$ refers to a correction coefficient of the bypass valve target flow rate and is set to between 0 and 1. $T_{ABV}$ refers to the temperature of the gas at the inlet of the bypass valve.

In block 512, the ECU may determine a compensated target flow rate based on the target flow rate and based on the flow compensation value for the respective valve. The ECU may determine the compensated target flow rate by adding the target flow rate to the flow compensation value for each valve. The ECU may use an equation similar to Equation 5 below to determine the compensated target flow rate for the restriction valve, and may use an equation similar to Equation 6 below to determine the compensated target flow rate for the bypass valve:

$$Q'_{ARV\_ref} = Q_{ARV\_ref} + \Delta Q_{ARV\_ref} \qquad \text{Equation 5:}$$

$$Q'_{ABV\_ref} = Q_{ABV\_ref} + \Delta Q_{ABV\_ref} \qquad \text{Equation 6:}$$

In Equation 5, $Q'_{ARV\_ref}$ refers to the compensated target flow rate for the restriction valve. In Equation 6, $Q'_{ABV\_ref}$ refers to the compensated target flow rate for the bypass valve.

In block 514, the ECU may determine a target pressure of the gas at an inlet of a respective valve and a target pressure of the gas at an outlet of the respective valve. The ECU may determine these target pressures based on the compensated target flow rates determined in block 512. The ECU may use an equation similar to Equation 7 below to determine the target pressure of the gas at the inlet of the restriction valve:

$$P_{ARVin\_ref} = P_{fc\_ref} - f_{fc}(Q_{fc\_ref}) - f_{ARVin}(Q'_{ARV\_ref}) \qquad \text{Equation 7:}$$

In Equation 7, $P_{ARVin\_ref}$ refers to the target pressure of the gas at the inlet of the restriction valve. $P_{fc\_ref}$ refers to an instantaneous target pressure of the gas at the inlet of the fuel cell stack. $f_{fc}$ refers to a pressure loss model representing the area between the inlet of the fuel cell stack and the outlet of the fuel cell stack. The pressure loss model may be provided as a physical formula or equation or as a lookup table or map, and may represent a relationship between pressure loss and flow rate. $f_{ARVin}$ refers to a pressure loss model representing the area between the outlet of the fuel cell stack and the inlet of the restriction valve. As with the first pressure loss model, $f_{ARVin}$ may be provided as a physical formula or equation or as a lookup table or map, and may likewise represent a relationship between pressure loss and flow rate.

The pressure loss model may, for example, include a lookup table or chart that shows a relationship between pressure loss and flow rate. The lookup table or chart may be utilized by finding the flow rate value that is nearest to the respective calculated flow rate in the lookup table or chart, and retrieving the pressure loss value that corresponds to the flow rate value in the table or chart.

The ECU may use an equation similar to Equation 8 below to determine the target pressure of the gas at the inlet of the bypass valve:

$$P_{ABVin\_ref} = P_{fc\_ref} \qquad \text{Equation 8:}$$

In Equation 8, $P_{ABVin\_ref}$ refers to the target pressure of the gas at the inlet of the bypass valve.

The ECU may use an equation similar to Equation 9 below to determine the target pressure of the gas at the outlet of the restriction valve:

$$A_{RVout\_ref} = P_{amb} + f_{ex}(Q'_{ARV\_ref} + Q'_{ABV\_ref}) + f_{ARVout}(Q'_{ARV\_ref}) \qquad \text{Equation 9:}$$

In Equation 9, $P_{ARVout\_ref}$ refers to the target pressure of the gas at the outlet of the restriction valve. $P_{amb}$ refers to the atmospheric pressure outside of and in the environment of the fuel cell stack. $f_{ex}$ refers to a pressure loss model representing the area between the upstream junction of the fuel cell branch and the bypass branch (i.e., where the pipe splits and part of the flow goes towards the fuel cell stack and part of the flow goes through the bypass branch) and the outlet of the fuel cell circuit (i.e., where the gas exits the fuel cell circuit, downstream from all elements of the fuel cell circuit). As with the other pressure loss model, $f_{ex}$ may be provided as a physical formula or equation or as a lookup table or map, and may likewise represent a relationship between pressure loss and flow rate. $f_{ARVout}$ refers to a pressure loss model representing the area between the outlet of the restriction valve and the downstream junction of the fuel cell branch and the bypass branch (i.e., where the pipes join and the bypass flow rejoins with the flow through the fuel cell stack).

The ECU may use an equation similar to Equation 10 below to determine the target pressure of the gas at the outlet of the bypass valve:

$$P_{ABVout\_ref} = P_{amb} + f_{ex}(Q'_{ARV\_ref} + Q'_{ABV\_ref}) + f_{ABVout}(Q'_{ABV\_ref}) \quad \text{Equation 10:}$$

In Equation 10, $P_{ABVout\_ref}$ refers to the target pressure of the gas at the outlet of the bypass branch. $f_{ABVout}$ refers to a pressure loss model representing the area between the outlet of the bypass valve and the downstream junction of the fuel cell branch and the bypass branch.

In block 516, the ECU may determine a desired valve position of the valve based on the information determined above including the compensated target flow rate, the target pressure at the inlet of the valve, and the target pressure at the outlet of the valve. The ECU may first determine a target cross-sectional area of the valve and may then calculate the desired or target valve position based on the target cross-sectional area. For example, the ECU may use an equation similar to Equation 11 below to determine the target cross-sectional area of the restriction valve:

$$A_{e\_ARV\_ref} = f_{ARV\_FF}(Q'_{ARV\_ref}, P_{ARVin\_ref}, P_{ARVout\_ref}) \quad \text{Equation 11:}$$

In Equation 11, $A_{e\_ARV\_ref}$ refers to the target cross-sectional area of the restriction valve. $f_{ARV\_FF}$ refers to a model representing the target cross-sectional area of the restriction valve. The output of the model is provided in meters squared ($m^2$). The ECU may use an equation similar to Equation 12 as the model $f_{ARV\_FF}$ when the flow is a non-choked flow (i.e., when $$\frac{P_{ARVout\_ref}}{P_{ARVin\_ref}} \geq \left(\frac{2}{\gamma+1}\right)^{\frac{\gamma}{\gamma-1}}).$$

$$A_{e\_ARV\_ref} = \frac{(\dot{m}_{ARV\_ref})}{\left(\frac{P_{ARVin\_ref}}{\sqrt{RT_{ARV}}}\left(\frac{P_{ARVout\_ref}}{P_{ARVin\_ref}}\right)^{\frac{1}{\gamma}}\right)\sqrt{\left\{\frac{2\gamma}{\gamma-1}\left[1-\left(\frac{P_{ARVout\_ref}}{P_{ARVin\_ref}}\right)^{\frac{\gamma-1}{\gamma}}\right]\right\}}} \quad \text{Equation 12}$$

In Equation 12, $\dot{m}_{ARV\_ref}$ represents the current or present mass flow of the fluid through the restriction valve. $\gamma$ represents the specific heat ratio of the gas and is defined as the ratio of the specific heat of the gas at constant pressure to its specific heat at constant volume. The ECU may use an equation similar to Equation 13 below as the model for $f_{ARV\_FF}$ when the flow is a choked flow (i.e., when $$\left(\text{i.e., when } \frac{P_{ARVout\_ref}}{P_{ARVin\_ref}} < \left(\frac{2}{\gamma+1}\right)^{\frac{\gamma}{\gamma-1}}\right).$$

$$A_{e\_ARV\_ref} = \frac{\dot{m}_{ARV\_ref}}{\frac{P_{ARVin\_ref}}{\sqrt{RT_{ARV}}}\sqrt{\gamma}\left(\frac{2}{\gamma+1}\right)^{\frac{\gamma+1}{2(\gamma-1)}}} \quad \text{Equation 13}$$

The ECU may determine a desired or target valve position of the restriction valve based on the target valve area of the restriction valve. The valve position may be provided as an angle that represents an angle of the valve.

The ECU may use an equation similar to Equation 14 below to determine the desired or target valve position of the restriction valve:

$$\theta_{ARV\_ref} = f_{ARV}(A_{e\_ARV\_ref}) \quad \text{Equation 14:}$$

In Equation 14, $\theta_{ARV\_ref}$ represents the desired or target valve position of the restriction valve. $f_{ARV}$ represents a model that converts a cross-sectional area of the restriction valve to a valve position of the restriction valve (e.g., a valve angle). The model may be provided as a physical formula or equation or as a lookup table or map.

The ECU may use an equation similar to Equation 15 below to determine the target cross-sectional area of the bypass valve:

$$A_{e\_ABV\_ref} = f_{ABV\_FF}(Q'_{ABV\_ref}, P_{ABVin\_ref}, P_{ABVout\_ref}) \quad \text{Equation 15:}$$

In Equation 15, $A_{e\_ABV\_ref}$ refers to the target cross-sectional area of the bypass valve. $f_{ABV\_FF}$ refers to a model representing the target cross-sectional area of the restriction valve. The output of the model is provided in meters squared ($m^2$). The ECU may use an equation similar to Equation 12 as the model $f_{ABV\_FF}$ (replacing restriction valve variables with bypass valve variables and vice versa) when the flow is a non-choked flow, and may use an equation similar to Equation 13 as the model $f_{ABV\_FF}$ (replacing restriction valve variables with bypass valve variables and vice versa) when the flow is a choked flow.

The ECU may determine a desired or target valve position of the bypass valve based on the target valve area of the bypass valve. The valve position may be provided as an angle that represents an angle of the valve. The ECU may use an equation similar to Equation 16 below to determine the desired or target valve position of the bypass valve:

$$\theta_{ABV\_ref} = f_{ABV}(A_{e\_ABV\_ref}) \quad \text{Equation 16:}$$

In Equation 16, $\theta_{ABV\_ref}$ represents the desired or target valve position of the bypass valve. $f_{ABV}$ represents a model that converts a cross-sectional area of the restriction valve to a valve position of the restriction valve (e.g., a valve angle). The model may be provided as a physical formula or equation or as a lookup table or map.

In block 518, the ECU may repeat some or all of the previous blocks for additional valves. In some embodiments, the calculation of the desired valve positions for each valve are performed simultaneously and, in some embodiments, the calculation of the desired valve positions for each valve are performed sequentially (in any order). In some embodiments, the calculations for one or more valves may be performed simultaneously while the calculations for one or more valves may be performed sequentially.

In block 520, the ECU may control the valves to have the desired valve positions that were determined in blocks 516 and 518.

Figure 6A:
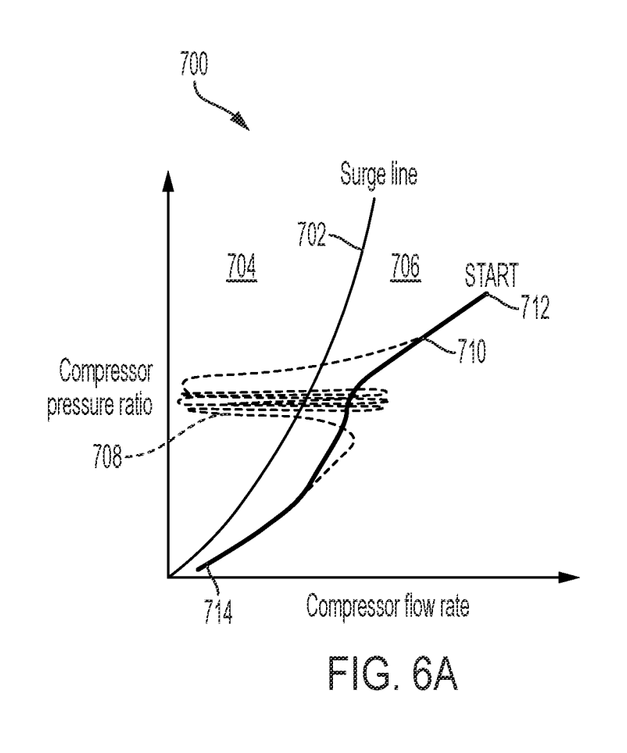
FIG. 6A is a graph illustrating operation of a compressor of a fuel cell circuit both with and without compensating for fluid accumulation or decumulation in the fuel cell circuit according to an embodiment of the present invention.
Figure 6B:
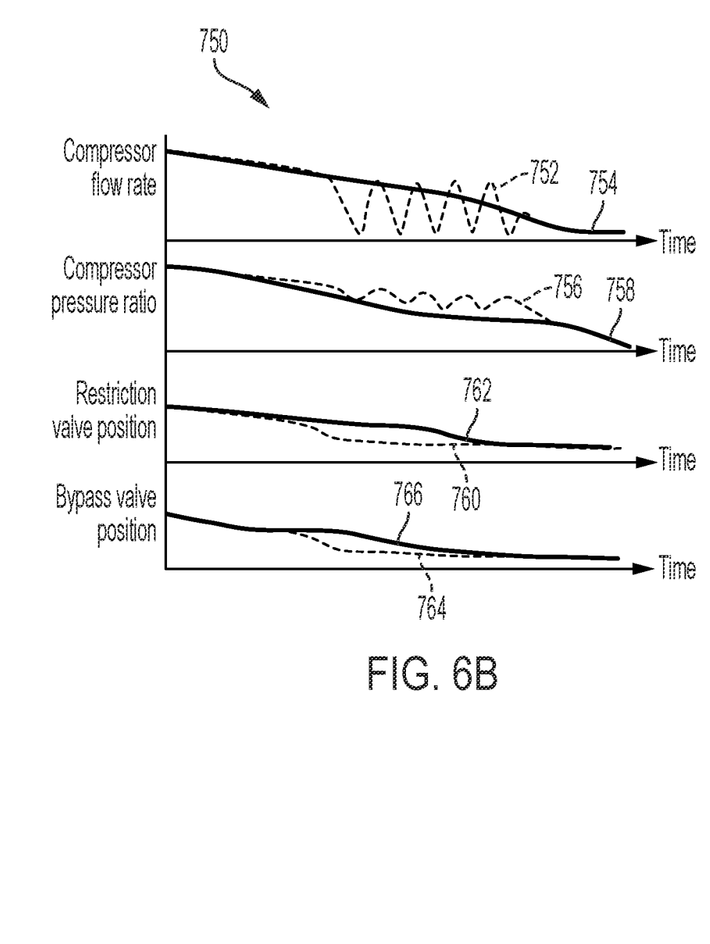
FIG. 6B is a graph illustrating operation of the compressor of FIG. 6A and valve positions of valves of the fuel cell circuit of FIG. 6A both with and without compensating for the fluid accumulation or decumulation in the fuel cell circuit according to an embodiment of the present invention.

Referring now to FIGS. 6A and 6B, a first graph illustrates operation of a compressor in a fuel cell circuit similar to the fuel cell circuit 118 of FIG. 2 without the method 500 of FIG. 5, and operation of the compressor utilizing the method

500. A second graph 750 illustrates an exemplary operation of the compressor, restriction valve, and bypass valve without the method 500 of FIG. 5, and an exemplary operation of these components using the method 500.

The graph 700 illustrates operation of the compressor (shown as a relationship between compressor pressure ratio (Y-axis) and compressor flow rate (X-axis)) during a deceleration event of the compressor. In particular, a line 702 illustrates a surge line. Operation of the compressor in first region 704 to the left of the surge line 702 represents the compressor undesirably operating in a surge state. Operation of the compressor in a second region 706 to the right of the surge line 702 represents the compressor desirably operating in a non-surge state. Thus, it is desirable for the compressor to operate only in the second region 706.

As referenced above, the graph 700 illustrates the compressor operation during a deceleration event. In that regard, the compressor state may change from a start state 712 to an end state 714 having a reduced pressure ratio and flow rate relative to the start state 712. A first line 708 illustrates operation of the compressor based on target flow rates of valves that are determined without compensating for dynamic fluid accumulation or decumulation (e.g., without implementing blocks 510 and 512 of the method 500 of FIG. 5). A second line 710 illustrates operation of the compressor based on target flow rates of valves that are determined with compensation for the dynamic fluid accumulation or decumulation (e.g., by implementing blocks 510 and 512 of the method 500 of FIG. 5). As shown during the deceleration event, the first line 708 (i.e., compressor operation without compensation) undesirably oscillates between a surge state and a non-surge state. However, by compensating for fluid accumulation or decumulation, the second line 710 remains in the non-surge state during the entire deceleration event.

Referring now to the graph 750, a first line 752 illustrates the compressor flow rate over a period of time during the deceleration and without compensation, and a second line 756 illustrates the compressor flow rate over the same period of time without the compensation. A third line 760 illustrates the valve position of a restriction valve over the same period of time during the deceleration and without the compensation, and a fourth line 764 illustrates the valve position of a bypass valve over the same period of time and without the compensation. As shown, the compressor flow rate and the compressor pressure ratio both oscillate during the deceleration due to the fluid accumulation or decumulation in the pipes. Similarly, the valve position of both the restriction valve and the bypass valve overcorrect and close quickly at first and then remain constant for the remainder of the deceleration.

A fifth line 754 illustrates the compressor flow rate during the deceleration and with compensation, and a sixth line 758 illustrates the compressor pressure ratio during the deceleration and with the compensation. A seventh line 762 illustrates the valve position of the restriction valve during the deceleration and with the compensation, and an eighth line 766 illustrates the valve position of the bypass valve during the deceleration and with the compensation. As shown, the compressor flow rate and the compressor pressure ratio both reduce gradually during the deceleration without oscillating (which occurs during the deceleration without the compensation). Likewise, the valve position of both the restriction valve and the bypass valve close more slowly and avoid the overcorrection that occurs during the deceleration without the compensation.

As is evidenced by the results shown in FIGS. 6A and 6B, control of actuators of a fuel cell circuit using a model that compensates for fluid accumulation or decumulation results in better control of the actuators and avoids the compressor operating in a surge condition.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling gas flow in a fuel cell circuit of a vehicle comprising:
   a fuel cell stack having a plurality of fuel cells and programmed to receive a gas;
   a valve having a valve position and programmed to adjust a flow of the gas through at least a portion of the fuel cell circuit; and
   an electronic control unit (ECU) coupled to the sensor and the valve and programmed to:
   determine a target flow rate of the gas through the valve,
   determine a flow compensation value corresponding to an amount of compensation of the target flow rate of the gas through the valve that compensates for fluid accumulation or decumulation in the fuel cell circuit,
   determine a compensated target flow rate of the gas through the valve based on the target flow rate and the flow compensation value,
   determine a desired valve position of the valve based on the compensated target flow rate, and
   control the valve to have the desired valve position.

2. The system of claim 1 wherein the valve has an inlet and an outlet, and the ECU is further programmed to:
   calculate a target pressure of the gas at the inlet of the valve and a target pressure of the gas at the outlet of the valve, and
   determine the desired valve position based on the compensated target flow rate, based on the target pressure of the gas at the inlet of the valve, and based on the target pressure of the gas at the outlet of the valve.

3. The system of claim 1 wherein the ECU is further programmed to calculate the flow compensation value based on a changing target pressure of the gas at the fuel cell stack.

4. The system of claim 3 wherein the changing target pressure of the gas is a derivative value that changes over time.

5. The system of claim 3 further comprising a compressor located upstream from the fuel cell stack and programmed to pump the gas through the fuel cell circuit, wherein the ECU is further programmed to calculate the flow compensation value based on a volume of an entire path between the compressor and the valve.

6. The system of claim 1 further comprising a pressure sensor programmed to detect a detected pressure value of the gas in the fuel cell circuit and a flow sensor programmed to detect a detected flow value of the gas through the fuel cell circuit, wherein the ECU is further configured estimate current pressure values and current flow values of the gas at each element of the fuel cell circuit based on the detected pressure value and the detected flow value.

7. The system of claim 1 wherein the valve is at least one of a restriction valve located in series with and downstream from the fuel cell stack, an inlet valve located in series with and upstream from the fuel cell stack, or a bypass valve located in parallel with the fuel cell stack.

8. The system of claim 1 wherein:
the valve includes:
a restriction valve located in series with and downstream from the fuel cell stack, and
a bypass valve located in parallel with the fuel cell stack; and
the ECU is programmed to:
determine the target flow rate of the gas through each of the restriction valve and the bypass valve,
determine the flow compensation value for each of the restriction valve and the bypass valve,
determine the compensated target flow rate of the gas for each of the restriction valve and the bypass valve,
determine the desired valve position for each of the restriction valve and the bypass valve, and
control each of the restriction valve and the bypass valve to have the desired valve position.

9. A system for controlling gas flow in a fuel cell circuit of a vehicle comprising:
a fuel cell stack having a plurality of fuel cells and programmed to receive a gas;
a valve having an inlet, an outlet, and a valve position and programmed to adjust a flow of the gas through at least a portion of the fuel cell circuit; and
an electronic control unit (ECU) coupled to the sensor and the valve and programmed to:
determine a target flow rate of the gas through the valve,
determine a flow compensation value corresponding to an amount of compensation of the target flow rate of the gas through the valve that compensates for fluid accumulation or decumulation in the fuel cell circuit,
determine a compensated target flow rate of the gas through the valve based on the target flow rate and the flow compensation value,
calculate a target valve pressure of the gas at least one of at the inlet of the valve or at the outlet of the valve;
determine a desired valve position of the valve based on the compensated target flow rate and the target valve pressure, and
control the valve to have the desired valve position.

10. The system of claim 9 wherein the ECU is further programmed to calculate the flow compensation value based on a target pressure of the gas at the fuel cell stack, the target pressure of the gas at the fuel cell stack being a derivative value that changes over time.

11. The system of claim 9 further comprising a compressor located upstream from the fuel cell stack and programmed to pump the gas through the fuel cell circuit, wherein the ECU is further programmed to calculate the flow compensation value based on a volume of an entire path between the compressor and the valve.

12. The system of claim 9 wherein:
the valve includes:
a restriction valve located in series with and downstream from the fuel cell stack, and
a bypass valve located in parallel with the fuel cell stack; and
the ECU is programmed to:
determine the target flow rate of the gas through each of the restriction valve and the bypass valve,
determine the flow compensation value for each of the restriction valve and the bypass valve,
determine the compensated target flow rate of the gas for each of the restriction valve and the bypass valve,
determine the desired valve position for each of the restriction valve and the bypass valve, and
control each of the restriction valve and the bypass valve to have the desired valve position.

13. A method for controlling gas flow in a fuel cell circuit of a vehicle, the method comprising:
determining, by an electronic control unit (ECU), a target flow rate of a gas through a valve of the fuel cell circuit;
determining, by the ECU, a flow compensation value corresponding to an amount of compensation of the target flow rate of the gas through the valve that compensates for fluid accumulation or decumulation in the fuel cell circuit;
determining, by the ECU, a compensated target flow rate of the gas through the valve based on the target flow rate and the flow compensation value;
determining, by the ECU, a desired valve position of the valve based on the compensated target flow rate; and
controlling, by the ECU, the valve to have the desired valve position.

14. The method of claim 13 further comprising:
calculating, by the ECU, a target pressure of the gas at an inlet of the valve and a target pressure of the gas at an outlet of the valve; and
determining, by the ECU, the desired valve position based on the compensated target flow rate, based on the target pressure of the gas at the inlet of the valve, and based on the target pressure of the gas at the outlet of the valve.

15. The method of claim 13 further comprising calculating, by the ECU, the flow compensation value based on a changing target pressure of the gas at a fuel cell stack of the fuel cell circuit.

16. The method of claim 15 wherein the changing target pressure of the gas is a derivative value that changes over time.

17. The method of claim 15 wherein calculating the flow compensation value includes calculating the flow compensation value based on a volume of an entire path between the compressor and the valve.

18. The method of claim 13 further comprising:
detecting, by a pressure sensor, a detected pressure value of the gas in the fuel cell circuit;
detecting, by a flow sensor, a detected flow value of the gas through the fuel cell circuit; and
estimating, by the ECU, current pressure values and current flow values of the gas at each element of the fuel cell circuit based on the detected pressure value and the detected flow value.

19. The method of claim 13 wherein the valve is at least one of a restriction valve located in series with and downstream from the fuel cell stack, an inlet valve located in series with and upstream from the fuel cell stack, or a bypass valve located in parallel with the fuel cell stack.

20. The method of claim 19 wherein:
determining the target flow rate of the gas through the valve includes determining the target flow rate for each of the restriction valve and the bypass valve;
determining the flow compensation value for the valve includes determining the flow compensation value for each of the restriction valve and the bypass valve;
determining the compensated target flow rate of the gas through the valve includes determining the compensated target flow rate of the gas through each of the restriction valve and the bypass valve;

determining the desired valve position of the valve includes determining the desired valve position for each of the restriction valve and the bypass valve; and controlling the valve to have the desired valve position includes controlling each of the restriction valve and the bypass valve to have the desired valve position.

\* \* \* \* \*